(12) United States Patent
Matsumoto (10) Patent No.: US 7,897,243 B2
(45) Date of Patent: Mar. 1, 2011

(54) STRUCTURE HAVING SPECIFIC SURFACE SHAPE AND PROPERTIES AND (METH)ACRYLIC POLYMERIZABLE COMPOSITION FOR FORMATION OF THE STRUCTURE

(75) Inventor: Tsukasa Matsumoto, Yokohama (JP)

(73) Assignee: The Inctec Inc., Yokohama-shi (JP)

( * ) Notice: Subject to any disclaimer, the term of this patent is extended or adjusted under 35 U.S.C. 154(b) by 376 days.

(21) Appl. No.: 12/064,478

(22) PCT Filed: Sep. 28, 2006

(86) PCT No.: PCT/JP2006/319380
§ 371 (c)(1),
(2), (4) Date: Feb. 22, 2008

(87) PCT Pub. No.: WO2007/040159
PCT Pub. Date: Apr. 12, 2007

(65) Prior Publication Data
US 2009/0246494 A1    Oct. 1, 2009

(30) Foreign Application Priority Data
Oct. 4, 2005   (JP) .................................. 2005-291795

(51) Int. Cl.
  B23B 3/00   (2006.01)
  B05D 5/06   (2006.01)
  B32B 1/00   (2006.01)
  B32B 37/02  (2006.01)
  C08F 26/02  (2006.01)
  C08F 20/06  (2006.01)

(52) U.S. Cl. ......... 428/156; 427/162; 428/172; 428/220; 156/212; 526/302; 526/318.4

(58) Field of Classification Search ................... 428/172; 427/162
See application file for complete search history.

(56) References Cited

U.S. PATENT DOCUMENTS
6,583,198 B2 *  6/2003  Sato et al. ..................... 522/100

FOREIGN PATENT DOCUMENTS
JP          2003 53834       2/2003
(Continued)

*Primary Examiner* — David R Sample
*Assistant Examiner* — Tahseen Khan
(74) *Attorney, Agent, or Firm* — Oblon, Spivak, McClelland, Maier & Neustadt, L.L.P.

(57) ABSTRACT

A surface shape and physical properties required for a structure having an antireflection performance of light and an improved performance of light permeability have been found, particularly the structure having surface scratch resistance is provided, a composition capable of forming the structure having such a particular structure and physical properties is provided, and further a composition which can easily form the structure which is excellent in antireflection performance of light and an improved performance of light permeability and has a large aspect ratio is provided. That is, the present invention is the structure having convex parts with an average height of 100 nm or more and 1000 nm or less or concave parts with an average depth of 100 nm or more and 1000 nm or less on its surface wherein the convex parts or the concave parts are present at an average cycle of 100 nm or more and 400 nm or less in at least one direction, characterized in that the structure is obtained by polymerizing a (meth)acrylic polymerizable composition by light irradiation, electron beam irradiation and/or heating and a storage elastic modulus at 180° C. or above is 0.5 GPa or more.

24 Claims, 2 Drawing Sheets

FOREIGN PATENT DOCUMENTS

| | | |
|---|---|---|
| JP | 2003 98304 | 4/2003 |
| JP | 2003 147209 | 5/2003 |
| JP | 2003 313215 | 11/2003 |
| JP | 2005-10231 | 1/2005 |
| JP | 2005 156695 | 6/2005 |
| JP | 2005 250469 | 9/2005 |
| JP | 2006 62240 | 3/2006 |
| WO | WO 2004042434 A1 * | 5/2004 |

* cited by examiner

STRUCTURE HAVING SPECIFIC SURFACE SHAPE AND PROPERTIES AND (METH)ACRYLIC POLYMERIZABLE COMPOSITION FOR FORMATION OF THE STRUCTURE

TECHNICAL FIELD

The present invention relates to a structure having a particular surface shape and physical properties, particularly relates to a structure having an antireflection performance of light, an improved performance of light permeability and a surface scratch resistant performance, and more particularly relates to a structure for a surface layer providing a good visibility to displays and a (meth)acrylic polymerizable composition for forming the structure.

BACKGROUND ART

For a surface layer used for a display and the like, (1) those obtained by a method generally referred to as a dry method, i.e., making a dielectric multilayer film in a vapor phase process and realizing a low reflectance with an optical interference effect and (2) those obtained by a method generally referred to as a wet method, i.e., coating a low refractive index material on a substrate film have been used. As a technology which is quite different principally from (1) and (2), (3) it has been known that the low reflectance can be realized by providing a fine structure to the surface (Patent Documents 1 to 10).

In general, such a surface layer has required not only an antireflection performance of light and an improved performance of the light permeability, but also a certain mechanical strength to withstand abrasion and scratches in practical use.

However, for the surface layer having the surface fine structure described in the above (3), the good antireflection performance is obtained while the mechanical strength such as surface scratch resistance is insufficient. Thus, the surface layer easily abrades away and is easily scratched. Therefore, it has not come in practical use yet.

For example, in Patent Documents 1 to 10, materials for such an antireflection film are listed, and a (meth)acrylate compound is described therein to be used as a polymerizable resin. However, the materials listed there are quite usual materials for forming ordinary polymer films, and they are not the materials which are discussed from the aspect of the present invention. Namely, Patent Documents 1 to 10 do not describe the surface layer having the special surface fine structure described in (3), which is made practical for the mechanical strength such as surface scratch resistance by selecting these materials.

Furthermore, the antireflection film having the fine structure on the surface in the above described (3) has the special fine structure on the surface so as to suitably prevent the reflection. Thus, for the materials to be selected for the antireflection film, a special physical property is required. However, what kind of physical property is required has been scarcely known.

Patent Document 1: JP Sho-50-070040-A
Patent Document 2: JP Hei-9-193332-A
Patent Document 3: JP 2003-162205-A
Patent Document 4: JP 2003-215314-A
Patent Document 5: JP 2003-240903-A
Patent Document 6: 2004-004515-A
Patent Document 7: 2004-059820-A
Patent Document 8: 2004-059822-A
Patent Document 9: 2005-010231-A
Patent Document 10: 2005-092099-A

DISCLOSURE OF INVENTION

Problem to be Solved by the Invention

In flat panel displays (hereinafter abbreviated as "FPD") such as liquid crystal displays (LCD) and plasma displays (PDP), attachment of the antireflection film is essential to ensure its visibility. As such an antireflection film, the inorganic or organic multilayer films shown in the above described (1) or (2), and the antireflection film having the surface fine structure in the above described (3) have been known.

However, for the antireflection film having the surface fine structure, its preferable structure and the antireflection performance are known, but its mechanical strength such as scratch resistance in the use for the outmost surface of FPD is insufficient in the material which forms its structure. Therefore, the film has not come in practical use yet. Thus, if an antireflection film having the surface fine structure which is excellent in mechanical strength such as scratch resistance is provided, this antireflection film can contribute to the enhancement of visibility in FPD.

That is, a problem of the present invention is to find a surface shape and physical properties required for the structure having the antireflection performance of the light and an improved performance of light permeability, and especially, to provide the structure having good mechanical strength such as surface scratch resistance. Also, the problem is to provide a composition which can form the structure having such a special surface shape and physical properties. In addition, the problem is to provide a composition which can form well the structure which is more excellent in antireflection performance and an improved performance of light permeability, and has a large aspect ratio.

Means for Solving Problem

As a result of an extensive study for solving the above problems, the present inventor has found that the above problems can be solved if a structure having a particular surface shape and physical properties is formed by polymerizing a particular composition, and reached the present invention. The present inventor also has found that a (meth)acrylic polymerizable composition having a particularly combined composition is extremely suitable as a material for forming the above described structure, and reached the present invention.

That is, the present invention provides a structure having convex parts with an average height of 100 nm or more and 1000 nm or less or concave parts with an average depth of 100 nm or more and 1000 nm or less, wherein the convex parts or the concave parts are present at an average cycle of 100 nm or more and 400 nm or less in at least one direction, and provides a structure characterized in that the structure is obtained by polymerizing a (meth)acrylic polymerizable composition by light irradiation, electron beam irradiation and/or heating and that a storage elastic modulus at 180° C. or above is 0.5 GPa or more.

The present invention also provides the above described structure wherein the above described (meth)acrylic polymerizable composition contains urethane(meth)acrylate and ester(meth)acrylate.

The present invention also provides the above described structure wherein the above described (meth)acrylic polymerizable composition further contains epoxy(meth)acrylate. The present invention also provides the above structure obtained by polymerizing the (meth)acrylic composition containing a modified silicone oil.

The present invention also provides a method for producing the above described structure, characterized in that a (meth)acrylic polymerizable composition is supplied to a mould having convex parts with an average height of 100 nm or more and 1000 nm or less and concave parts with an average depth of 100 nm or more and 1000 nm or less on its surface which are present at an average cycle of 100 nm or more and 400 nm or less in at least one direction, and a substrate is attached from the above obliquely to the surface of the mould and is bonded with pressure from a substrate side by using a roller, and then the (meth)acrylic polymerizable composition is cured followed by being peeled from the mould.

The present invention also provides a (meth)acrylic polymerizable composition for forming the above described structure.

EFFECT OF THE INVENTION

According to the present invention, it is possible to provide the structure which is excellent in antireflection performance of the light, an improved performance of light permeability and surface scratch resistant performance. It is also possible to provide the composition capable of forming the structure which is excellent in such performances and has the particular structure and the particular physical properties. Furthermore, it is possible to provide the composition capable of forming well the structure even if it has the large aspect ratio. Specifically, it is possible to provide the structure having the excellent optical properties and mechanical strength, for example, when it is used as an antireflection film, a film of which light permeability is improved, a surface protection film of the surface layer in FPD, etc.

BEST MODES FOR CARRYING OUT THE INVENTION

Shape of Structure Surface

In the structure of the present invention, it is essential to have convex parts with an average height of 100 nm or more and 1000 nm or less or concave parts with an average depth of 100 nm or more and 1000 nm or less on at least one surface thereof. Here the convex part refers to a part which bulges from a standard face, and the concave part refers to a part which dents from the standard face. The structure of the present invention may have the convex part or the concave part on the surface. Also the structure may have both the convex part and the concave part, and further may have a undulating structure obtained by linking them.

The structure may have the convex parts or the concave parts on both sides of the structure, but it is essential to have them on at least one surface. Particularly, it is preferable to have them on an outmost surface in contact with air. This is because, the air is largely different in refraction index from the structure of the present invention, and the antireflection performance and an improved performance of light permeability are achieved well by making an interface of substances having the different refraction index one another a particular structure of the present invention. This is also because by the structure of the present invention having a special structure on its outmost surface to which a mechanical external force is easily given, the effect of the physical property (particular storage elastic modulus) essential for the structure of the present invention described later is achieved to improve the scratch resistance of the surface.

It is preferable for achieving the above effects that the convex parts or the concave parts are present evenly on the entire surface of the structure. In the case of the convex part, it is essential that the average height from the standard face is 100 nm or more and 1000 nm or less. In the case of the concave part, it is essential that the average depth from the standard face is 100 nm or more and 1000 nm or less. The height or the depth need not be constant, and their average value may be the above described range, but it is preferable to have the constant height or the constant depth substantially.

Both in the case of the convex part and in the case of the concave part, the average height or the average depth is preferably 150 nm or more and particularly preferably 200 nm or more. Also it is preferably 600 nm or less and particularly preferably 500 nm or less. When the average height or the average depth is too small, the good optical property is not appeared in some cases. When it is too large, the manufacture thereof becomes difficult in some cases. In the case of having the undulating structure obtained by linking the convex parts and the concave parts, it is preferable that an average length of the highest part (above the convex part) and the deepest part (below the concave part) is 100 nm or more and 1000 nm or less for the same reason.

In the structure of the present invention, it is essential that the above convex parts or concave parts are arranged so that the average cycle in at least certain one direction is 100 nm or more and 400 nm or less. The convex parts or the concave parts may be arranged randomly or arranged with regularity. In any case, it is preferable in terms of antireflection and light permeability that the above convex parts or concave parts are substantially evenly arranged on the entire surface of the structure. Also it could be arranged so that the average cycle is 100 nm or more and 400 nm or less for at least the certain one direction, and it is not necessary that the average cycle is 100 nm or more and 400 nm or less for all directions.

When the convex parts or the concave parts are arranged with regularity, they could be arranged so that the average cycle is 100 nm or more and 400 nm or less for at least the certain one direction as the above, but it is preferable to be arranged so that the cycle to the direction at which the cycle is the shortest (hereinafter referred to as an "x axis direction") is 100 nm or more and 400 nm or less. That is, it is preferable that the cycle for the x axis direction falls into the above range. Further, it is particularly preferable to be arranged so that the cycle is 100 nm or more and 400 nm or less also for a y axis direction, perpendicular to the x axis direction.

The average cycle ("the cycle", when it has the regularity in a place where the convex parts or the concave parts have been arranged) is preferably 120 nm or more, particularly preferably 150 nm or more, and preferably 250 nm or less and particularly preferably 200 nm or less. Even if the average cycle is too short or too long, the antireflection effect is not sufficiently obtained in some cases.

In the structure of the present invention, it is essential to have the above structure on its surface, and further, it is preferable in terms of having the good antireflection performance to have the structure generally referred to as a "moth eye structure". It is also preferable in terms of good antireflection performance to have the surface structure described in any of Patent Documents 1 to 10.

The aspect ratio which is a value obtained by dividing the height or the depth by the average cycle is not particularly limited, and is preferably 1 or more, particularly preferably 1.5 or more and more preferably 2 or more in terms of optical property. It is also preferably 5 or less and particularly preferably 3 or less in terms of structure production process. It has become possible for the first time to form the structure having the aspect ratio of 1.5 or more by polymerizing the (meth) acrylic polymerizable composition in the present invention. Therefore, also in order to exert the feature of the (meth) acrylic polymerizable composition in the present invention, the larger aspect ratio is more preferable, and the aspect ratio is particularly preferably 1.5 or more and more preferably 2 or more.

The structure of the present invention, by having the above special structure on its surface, reduces the reflectance of the light and enhances a performance of light permeability. In this case, the "light" includes at least the light having the wavelength in a visual light region.

[Storage Elastic Modulus of Structure]

Furthermore, in the structure of the present invention, it is essential that the storage elastic modulus at 180° C. or above is 0.5 GPa or more. In general, when the temperature of a substance obtained by polymerizing the (meth)acrylic polymerizable composition is raised from room temperature, then the storage elastic modulus is reduced to become constant at a certain temperature (about 150 to 180° C.) or above, and the substance exhibits rubber elasticity. The storage elastic modulus at 180° C. or above is the storage elastic modulus in such a rubber region. As a matter of course, when the structure is thermally decomposed at high temperature (e.g., 200° C. or above), a measured value at that temperature is not employed as the value of the "storage elastic modulus". The storage elastic modulus often becomes almost constant at 180° C. or more, and "at 180° C. or above" means "at least at one temperature at 180° C. or above".

That is, in the structure of the present invention, it is essential that the storage elastic modulus at least one temperature, which is 180° C. or above and which is lower than the temperature when the thermal decomposition of the structure substantially begins, is 0.5 GPa or more. Hereinafter, the "storage elastic modulus at 180° C. or above" is sometimes abbreviated simply as the "storage elastic modulus".

The storage elastic modulus is the physical property which does not depend on a shape and a size of a thing to be measured. In the present invention, the storage elastic modules is measured using a test piece of about 5 mm×about 20 mm×about 100 μm cut out from the structure or a test piece separately polymerized to become this size. Using a dynamic viscoelasticity tester DMS6100 supplied from Seiko Instruments Inc. as a measurement apparatus, the test piece having the above shape is sandwiched in a direction of 20 mm and it is scanned in the range at −20 to 200° C., and then the storage elastic modulus is measured at a temperature range of 180° C. to the temperature just before the decomposition temperature (e.g., 200° C.).

Generally, the storage elastic modulus in this region is less dependent on a measurement frequency, but in case that it depends on the frequency, the storage elastic modules measured at 10 Hz is specified.

In the structure of the present invention, it is essential that the storage elastic modules is 0.5 GPa or more, and the storage elastic modules is preferably 0.6 GPa or more and particularly preferably 0.7 GPa or more. When the storage elastic modules is too low, the mechanical strength at use temperature (e.g., room temperature) is deteriorated, the surface of the structure easily abrades away and the surface is easily scratched in some cases.

An action or a principle that the storage elastic modules at 180° C. or more is correlated with the mechanical strength at temperature of the structure generally to be used (e.g., 25° C. which is the room temperature) is unclear, but it is conceivable that it is because the storage elastic modulus in such a region is directly correlated with a crosslinking density which controls the mechanical strength.

[Constitution of Structure, Method for Formation Thereof]

Furthermore, it is essential that the structure of the present invention is obtained by polymerizing the (meth)acrylic polymerizable composition by light irradiation, electron beam irradiation and/or heating. That is, in the structure of the present invention, it is essential that carbon-carbon double bonds of (meth)acryl groups in the (meth)acrylic polymerizable composition are reacted by light irradiation, electron beam irradiation and/or heating. "(Meth)acryl" in the present invention means "acryl" or "methacryl", and the same applies hereinafter. "By light irradiation, electron beam irradiation and/or heating" may be by any one treatment in the group consisting of the light irradiation, the electron beam irradiation and the heating, any two treatments selected therefrom or a combination of all the three treatments.

It is essential that the structure of the present invention is obtained by reacting the carbon-carbon double bonds of the (meth)acryl groups. Their reaction rate is not particularly limited, but is preferably 85% or more and particularly preferably 90% or more. Here, the "reaction rate" is calculated from a ratio of an absorbance at 811 $cm^{-1}$ attributed to the carbon-carbon bonds to an absorbance at 1720 $cm^{-1}$ attributed to carbon-oxygen bonds of ester bands, which is measured by measuring the (meth)acrylic polymerizable composition before and after exposure by infrared spectroscopy (IR), specifically, a total reflection method (ATR method) using a Fourier transform infrared spectrophotometer, Spectrum One D (supplied from PerkinElmer, Inc.). The excessively low reflectance results in lowered mechanical strength and a lowered chemical resistance in some cases.

In order to make the storage elastic modulus 0.5 GPa or more, and further if necessary, in order to obtain the sufficient reaction rate and curability, a composition (e.g., types and combined amounts of (meth)acrylate compounds, a type and the amount of a polymerization initiator) of the (meth)acrylic polymerizable composition which is the material for forming the structure of the present invention described later can be controlled. Further, an irradiation condition of the light and the electron beam (e.g., an intensity, an exposure time period, a wavelength, oxygen elimination) used for the polymerization, a heating condition (e.g., temperature, a heating time period, the oxygen elimination) upon polymerization, and the shape (thickness) of the structure, and the like are also controlled.

The structure of the present invention has the special surface structure for exhibiting the low reflectance and the high permeability. Thus, the special physical property is required. The present invention is characterized in that the structure physical property where mechanical damages are hardly given to the above special surface fine structure and the mechanical strength such as surface scratch resistance is excellent has been found.

[Materials for Forming the Structure]

The structure of the present invention having the particular surface structure described above can provide the particular physical property described above in a favorable manner, when formed from the following materials. The materials for the structure of the present invention will be described below in detail.

It is essential that the structure of the present invention contains a polymer obtained by polymerizing the (meth)acrylic polymerizable composition. The (meth)acrylic polymerizable compositions are not particularly limited as long as they can form the above structure and they can provide the above physical property, and they are preferable to contain urethane(meth)acrylate and ester(meth)acrylate. "Urethane (meth)acrylate" refers to the (meth)acylate compound containing an urethane bond in the molecule. "Ester(meth)acrylate" refers to the compound having an ester bond obtained by the reaction of an acid group (including acid anhydrate and acid chloride) with a hydroxy group and having no urethane bond and no siloxane bond in the molecule.

Furthermore, it is preferable that the (meth)acrylic polymerizable composition in the present invention contains epoxy(meth)acrylate. "Epoxy(meth)acrylate" refers to the (meth)acylate compound having the structure obtained by reacting (meth)acrylic acid with an epoxy group.

Furthermore, it is preferable that the structure of the present invention is obtained by polymerizing the composition containing a modified silicone oil. The "modified silicone oil" refers to the compound having a siloxane bond and having a silicon (Si) atom to which an organic group other than methyl group has been also bound. The "modified silicone oil" includes silicon(meth)acrylate. Therefore, it is preferable that the (meth)acrylic polymerizable composition in the present invention contains silicon(meth)acrylate. "Silicon (meth)acrylate" refers to the (meth)acrylate compound having the siloxane bond in the molecule.

[1] Concerning Urethane(Meth)Acrylate

Urethane(meth)acrylate used in the present invention is not particularly limited, for example, positions and a number of the urethane bonds and the positions and the number of (meth)acryl groups are not particularly limited.

A preferable chemical structure of urethane(meth)acrylate used for forming the structure of the present invention includes (A) those having the structure obtained by reacting the compound having the hydroxy group and (preferably multiple) (meth)acrylic acid in the molecule to the compound having (preferably multiple) isocyanate groups in the molecule and (B) those having the structure obtained by reacting a diisocyanate compound or a triisocyanate compound to the compound having multiple hydroxy groups followed by reacting the compound such as hydroxyethyl(meth)acrylate having the hydroxy group and the (meth)acryl group in the molecule to unreacted isocyanate groups in the resulting compound.

Since the above (meth)acrylate compound contains urethane(meth)acrylate, the curability, the reaction rate and the storage elastic modulus of the obtained structure are increased, and as a result, it becomes excellent in flexibility. In the present invention, the "curability" refers to easiness to cure the (meth)acrylic polymerizable compound, and is largely influenced by the "reaction rate" which is calculated from a residual ratio of the double bonds. Further, the curability is influenced also by a progress of a tiny reaction which is not reflected to the reaction rate. Therefore, the "curability" is a concept taking the above mentioned influences into consideration.

[1-1] Concerning Tetrafunctional or Higher Urethane(Meth)Acrylate

It is preferable to contain tetrafunctional or higher urethane (meth)acrylate as urethane(meth)acrylate. That is, it is preferable to contain the compound having 4 or more (meth)acryl groups in the molecule. In this case, the positions and the number of the urethane bonds are not particularly limited and it is not particularly limited whether the (meth)acryl groups are present at the ends of molecular or not. The compound having 6 or more (meth)acryl groups in the molecule is particularly preferable, and the compound having 10 or more (meth)acryl groups in the molecule is more preferable. An upper limit of the number of the (meth)acryl groups in the molecule is not particularly limited, but the (meth)acryl groups are preferably 15 or less. When the number of the (meth)acryl groups in the urethane(meth)acrylate molecule is too small, the curability and the reaction rate of the resulting structure are reduced and the storage elastic modulus is decreased in some cases. Meanwhile, when the number of the (meth)acryl groups in the urethane(meth)acrylate molecule is too large, the consumption rate of the carbon-carbon double bonds in the (meth)acryl groups due to the polymerization, i.e., the reaction rate is not sufficiently increased in some cases.

The structure of tetrafunctional or higher urethane(meth)acrylate is not particularly limited, but it is preferable that the urethane(meth)acrylate is obtained by reacting a hydroxy group in a compound (b) having one hydroxy group and two or more (meth)acryl groups in the molecule to an isocyanate group in a polyvalent isocyanate compound (a).

In this case, the polyvalent isocyanate compound (a) is not particularly limited, and includes the compound having two or more isocyanate groups in the molecule. The compound having two isocyanate groups in the molecule includes, for example, 1,5-naphthylene diisocyanate, 4,4'-diphenylmethane diisocyanate, hydrogenated diphenylmethane diisocyanate, 1,3-phenylene diisocyanate, 1,4-phenylene diisocyanate, tolylene diisocyanate, butane-1,4-diisocyanate, hexamethylene diisocyanate, 2,2,4-trimethylhexamethylene diisocyanate, 2,4,4-trimethylhexamethylene diisocyanate, cyclohexane-1,4-diisocyanate, xylylene diisocyanate, isophorone diisocyanate, lysine diisocyanate, dicyclohexylmethane-4,4'-diisocyanate, 1,3-bis(isocyanatemethyl)cyclohexane, methylcyclohexane diisocyanate, and m-tetramethylxylylene diisocyanate. Also the compound having three isocyanate groups in the molecule includes, for example, trimethylol propane addition adduct bodies, biuret bodies and isocyanurate bodies obtained by modifying isophorone diisocyanate, tolylene diisocyanate, hexamethylene diisocyanate, and xylylene diisocyanate. Among them, in the present invention, isophorone diisocyanate, tolylene diisocyanate and hexamethylene diisocyanate and the like are particularly preferable.

The compound (b) having one hydroxy group and two or more (meth)acryl groups in the molecule is not particularly limited, and includes the compound obtained by reacting (p-1) (meth)acryl groups to the hydroxy groups in the compound (b-1) having three or more (made as P) hydroxy groups in the molecule; and the compound obtained by a ring-opening reaction of glycidyl(meth)acrylate and (meth)acrylic acid.

Here, the "compound (b) having one hydroxy group and two or more (meth)acryl groups in the molecule" also includes the case where the compound having two hydroxy groups in the molecule is contaminated and the case where the compound having one (meth)acryl group is contaminated when that compound is produced by partially reacting two or more compounds.

Among the compound (b), the "compound (b-1) having three or more hydroxy groups in the molecule" in the "compound obtained by reacting (p-1) (meth)acryl groups to the hydroxy groups in the compound (b-1) having (p) (p is an integer of three or more) hydroxy groups in the molecule" is not particularly limited, and includes, for example, glycerol, trimethylolethane, trimethylolpropane, pentaerythritol, tetramethylolethane, diglycerol, ditrimethylolethane, ditrimethylolpropane, dipentaerythritol and ditetramethylolethane; compounds obtained by modifying them with ethylene oxide; compounds obtained by modifying them with propylene oxide; compounds obtained by modifying isocyanuric acid with ethylene oxide, with propylene oxide and with ∈-caprolactone; and oligoester.

The number of the hydroxy groups in the compound (b-1) is particularly preferably 4 or more and more preferably 6 or more because the number of the functional groups in resulting urethane(meth)acrylate can be increased. Specifically, for example, diglycerol, ditrimethylolethane, ditrimethylolpropane, dipentaerythritol and ditetramethylolethane and the like are particularly preferable.

Taking diglycerol for example, by reacting (meth)acrylic acid to three hydroxy groups in four hydroxy groups in diglycerol, the compound (b) having one hydroxy group and two or more (three in this case) (meth)acryl groups in the molecule is synthesized. Furthermore, taking the case where the polyvalent isocyanate compound (a) is isophorone diisocyanate for example, two compounds (b) having one hydroxy group and two or more (meth)acryl groups are reacted to two isocyanate groups in isophorone diisocyanate to synthesize "tetrafunctional or higher urethane(meth)acrylate". At that time, if the compound (b) having one hydroxy group and three (meth)acryl groups in the molecule is reacted to isophorone diisocyanate, the "tetrafunctional or higher urethane(meth)acrylate" having six (meth)acryl groups in the molecule is consequently synthesized.

[1-2] Concerning Trifunctional or Lower Urethane(Meth)Acrylate

In urethane(meth)acrylate, trifunctional or lower urethane (meth)acrylate may be contained in addition to the above tetrafunctional or higher urethane(meth)acrylate. The chemical structure of such a trifunctional or lower urethane(meth)acrylate is not particularly limited, and those known publicly can be used.

A weight average molecular weight of trifunctional or lower urethane(meth)acrylate is preferably 1,000 or more and 30,000 or less and particularly preferably 2,000 or more and 10,000 or less. When the above molecular weight is too low, flexibility of the structure of the present invention is lowered in some cases. When the molecular weight is too high, the storage elastic modulus is lowered in some cases.

[1-2-1] Concerning Difunctional Urethane(Meth)Acrylate

It is preferable that the "trifunctional or lower urethane (meth)acrylate" contains difunctional urethane(meth)acrylate having each one (meth)acryl group at both ends in the molecule. Furthermore, it is particularly preferable that all of the "trifunctional or lower urethane(meth)acrylate compounds" are "difunctional urethane(meth)acrylate having each one (meth)acryl group at both ends in the molecule". By containing the above difunctional urethane(meth)acrylate, it is possible to enhance the flexibility of the structure as the curability and a reaction rate are enhanced.

The chemical structure of such a difunctional urethane (meth)acrylate is not particularly limited, and its weight average molecular weight is preferably 1,000 or more and 30,000 or less and particularly preferably 2,000 or more and 5,000 or less. When the molecular weight is too low, the flexibility is lowered in some cases. When the molecular weight is too high, the storage elastic modulus is lowered in some cases.

Such a difunctional urethane(meth)acrylate is not particularly limited, and the followings are preferable. That is, those obtained by reacting a diisocyanate compound (d) to both ends of a polymer or an oligomer (c) having hydroxy groups or, amino groups, etc. at both ends, and further reacting a compound (e) having the hydroxy group and the (meth)acryl groups in the molecule to both ends of the resulting "polymer or oligomer having isocyanate groups at both ends" are particularly preferable.

The polymer or oligomer (c) having the hydroxy groups at both ends are not particularly limited, and includes, for example, ester oligomers, ester polymers, urethane oligomers, urethane polymers, polyethylene glycol and polypropylene glycol. Among them, particularly preferably the ester oligomers and the ester polymers are included. The molecular weight of such an oligomer and polymer is not particularly limited, and the weight average molecular weight is preferably 1,000 to 5,000 and particularly preferably 2,000 to 3,000 in terms of curability.

A diol component of the above ester is not particularly limited, and includes ethylene glycol, propylene glycol, 1,4-butanediol, 1,6-hexanediol, diethylene glycol, triethylene glycol, tetraethylene glycol and 2,2'-thiodiethanol. Particularly preferable are 1,4-butanediol and 1,6-hexanediol.

A dicarboxylic acid component of the above ester is not particularly limited, and includes alkylene dicarboxylic acids such as oxalic acid, succinic acid, maleic acid and adipic acid; and aromatic dicarboxylic acids such as terephthalic acid and phthalic acid. Particularly preferable are adipic acid and terephthalic acid.

The diisocyanate compound (d) reacted to the both ends of such an oligomer or polymer is not particularly limited, and the same compounds with the diisocyanate compounds listed in the above section ([0047]) as the polyvalent isocyanate compounds (a) can be used. Particularly preferably, isophorone diisocyanate is included.

Furthermore, the "compound (e) having the hydroxy group and the (meth)acryl groups in the molecule" which is reacted to the both ends of the polymer or the oligomer having the isocyanate groups at both ends obtained above is not particularly limited, and includes, for example, 2-hydroxyethyl (meth)acrylate, 2-hydroxypropyl(meth)acrylate, ethylene glycol mono(meth)acrylate, and propylene glycol mono (meth)acrylate.

A weight ratio of [1-1] tetrafunctional or higher urethane (meth)acrylate to [1-2-1] difunctional urethane(meth)acrylate in [1] urethane(meth)acrylate is not particularly limited, and the amount of difunctional urethane(meth)acrylate is preferably 0 to 300 parts by weight, particularly preferably 1 to 200 parts by weight and more preferably 2 to 100 parts by weight relative to 100 parts by weight of tetrafunctional or higher urethane(meth)acrylate. When the amount of difunctional urethane(meth)acrylate is too large, storage elastic modulus is lowered and the structure having the storage elastic modulus of 0.5 GPa or more is not obtained in some cases. Thus, mechanical strength such as surface scratch resistance can not be sufficiently provided to the structure of the present invention having the above special surface shape in some cases.

2. Concerning Ester(Meth)Acrylate

It is preferable that the (meth)acrylic polymer for forming the structure of the present invention contains ester(meth)

acrylate in addition to urethane(meth)acrylate. By containing this ester(meth)acrylate, the structure is softened, and the mechanical strength of the surface having the special structure in the present invention becomes enhanced. It also becomes possible to prevent the flexibility of the structure from getting worse by using tetrafunctional or higher urethane(meth)acrylate used for enhancing the curability. When only difunctional urethane(meth)acrylate is contained without containing this ester(meth)acrylate, the structure becomes too soft and the mechanical strength becomes inferior in some cases.

Ester(meth)acrylate is not particularly limited, and includes difunctional or higher (meth)acrylate compounds as preferable ones.

Difunctional (meth)acrylate includes, for example, straight alkane diol di(meth)acrylate such as 1,4-butanediol di(meth)acrylate, 1,6-hexanediol di(meth)acrylate and 1,9-nonanediol di(meth)acrylate;

alkylene glycol di(meth)acrylate such as diethylene glycol di(meth)acrylate, triethylene glycol di(meth)acrylate, tetraethylene glycol di(meth)acrylate, polyethylene glycol #200 di(meth)acrylate, polyethylene glycol #300 di(meth)acrylate, polyethylene glycol #400 di(meth)acrylate, polyethylene glycol #600 di(meth)acrylate, dipropylene glycol di(meth)acrylate, tripropylene glycol di(meth)acrylate, tetrapropylene glycol di(meth)acrylate, polypropylene glycol #400 di(meth)acrylate and polypropylene glycol #700 di(meth)acrylate;

partial (meth)acrylate ester of trivalent or more alcohol such as pentaerythritol di(meth)acrylate, pentaerythritol di(meth)acrylate monostearate and pentaerythritol di(meth)acrylate monobenzoate;

bisphenol based di(meth)acrylate such as bisphenol A di(meth)acrylate, EO modified bisphenol A di(meth)acrylate, PO modified bisphenol A di(meth)acrylate, hydrogenated bisphenol A di(meth)acrylate, EO modified hydrogenated bisphenol A di(meth)acrylate, PO modified hydrogenated bisphenol A di(meth)acrylate, bisphenol F di(meth)acrylate, EO modified bisphenol F di(meth)acrylate, PO modified bisphenol F di(meth)acrylate and EO modified tetrabromobisphenol A di(meth)acrylate; and di(meth)acrylate such as neopentyl glycol di(meth)acrylate, neopentyl glycol PO modified di(meth)acrylate; hydroxypivalate neopentyl glycol ester di(meth)acrylate, caprolactone adduct di(meth)acrylate of hydroxypivalate neopentyl glycol ester; 1,6-hexanediol bis(2-hydroxy-3-acryloyloxypropyl)ether; tricyclodecane dimethylol di(meth)acrylate and isocyanurate EO modified di(meth)acrylate.

Trifunctional di(meth)acrylate includes, for example, glycerol PO modified tri(meth)acrylate, trimethylolpropane tri(meth)acrylate, trimethylolpropane EO modified tri(meth)acrylate, trimethylolpropane PO modified tri(meth)acrylate, isocyanurate EO modified tri(meth)acrylate, isocyanurate EO modified ε-caprolactone modified tri(meth)acrylate, 1,3,5-triacryloylhexahydro-s-triazine, pentaerythritol tri(meth)acrylate and dipentaerythritol tri(meth)acrylate tripropionate.

Tetrafunctional or higher (meth)acrylate includes, for example, pentaerythritol tetra(meth)acrylate, dipentaerythritol penta(meth)acrylate monopropionate, dipentaerythritol hexa(meth)acrylate, tetramethylolethane tetra(meth)acrylate and oligoester tetra(meth)acrylate.

The above mentioned (meth)acrylates may be used alone or in mixture of two or more, and it is preferable for increasing the curability and the reaction rate to contain at least difunctional ester(meth)acrylate. Furthermore, it is particularly preferable for a balance between the curability and the storage elastic modulus to use both difunctional ester(meth)acrylate and trifunctional or higher ester(meth)acrylate.

[2-1] Concerning Difunctional Ester(Meth)Acrylate

The above ester(meth)acrylate preferably contains difunctional ester(meth)acrylate in terms of for increasing the curability and enhancing the storage elastic modulus. Among the difunctional ester(meth)acrylate, it is preferable for further increasing the curability to contain difunctional ester(meth)acrylate having an alkylene glycol chain and containing each one (meth)acryl group at both ends of the molecule. Such a compound specifically includes alkylene glycol di(meth)acrylate described above. Particularly preferably, di(meth)acrylate compounds of alkylene glycol oligomer, such as triethylene glycol di(meth)acrylate, tetraethylene glycol di(meth)acrylate, tripropylene glycol di(meth)acrylate and tetrapropylene glycol di(meth)acrylate; and di(meth)acrylate compounds of alkylene glycol polymer, such as polyethylene glycol #200 di(meth)acrylate, polyethylene glycol #400 di(meth)acrylate and polyethylene glycol #600 di(meth)acrylate are included.

[2-2] Concerning Trifunctional or Higher Ester(Meth)Acrylate

It is particularly preferable for increasing the storage elastic modulus that the above ester(meth)acrylate contains trifunctional or higher ester(meth)acrylate. Specifically, for example, trifunctional (meth)acrylate or tetrafunctional or higher (meth)acrylate described above are included. The number of the functional groups is particularly preferably 4 or more and more preferably 5 or more. The more the number of the functional groups is, the better the curability is. Particularly preferably, dipentaerythritol hexaacrylate is included.

The weight ratio of difunctional ester(meth)acrylate to trifunctional or higher ester(meth)acrylate is not particularly limited, and the amount of trifunctional or higher ester(meth)acrylate is preferably 0 to 100 parts by weight, particularly preferably 0 to 80 parts by weight and more preferably 1 to 50 parts by weight relative to 100 parts by weight of difunctional ester(meth)acrylate. When the amount of trifunctional or higher ester(meth)acrylate is too large, the structure on which a cured film, etc. has been formed becomes fragile in some cases.

[3] Concerning Epoxy(Meth)Acrylate

It is preferable that the (meth)acrylic polymer for forming the structure of the present invention contains epoxy(meth)acrylate in addition to urethane(meth)acrylate and ester(meth)acrylate. By containing this epoxy(meth)acrylate, the structure becomes tougher, and the mechanical strength such as scratch resistance of the surface having the special structure of the present invention becomes enhanced.

The above "epoxy(meth)acrylate" is not particularly limited, and specifically includes, for example, those having the structure in which (meth)acrylic acid has been added to diglycidyl ethers of alkylene glycol such as ethylene glycol diglycidyl ether, diethylene glycol diglycidyl ether, triethylene glycol diglycidyl ether, propylene glycol diglycidyl ether, dipropylene glycol diglycidyl ether, tripropylene glycol diglycidyl ether; glycerol glycidyl ethers such as glycerol diglycidyl ether; and diglycidyl ethers of bisphenol based compounds such as bisphenol A diglycidyl ether, hydrogenated bisphenol A diglycidyl ether, PO modified diglycidyl ether of bisphenol A and bisphenol F diglycidyl ether. Also, those having the structure in which (meth)acrylic acid has been added to a condensed/polymerized epoxy resin are included. Furthermore, those having the structure in which (meth)acrylic acid has been added to the epoxy resin having the structure obtained by reacting, for example, epichlorohydrin to a condensed/polymerized product of phenol novolak or cresol novolak are included.

[4] Concerning Modified Silicone Oil

It is preferable that the (meth)acrylic polymer for forming the structure of the present invention, furthermore, contains modified silicone oil in addition to urethane(meth)acrylate and ester(meth)acrylate. By containing the modified silicone oil in the (meth)acrylate compound, the storage elastic modulus of the resulting structure becomes large, and also, the mechanical strength such as scratch resistance becomes enhanced for the above special surface shape. While the formation of the structure of the present invention has a process of peeling the cured structure from a mould. In the process of peeling, a shape-holding property becomes important. However, in the present invention, the use of the modified silicone oil is rather more effective for improvement of the surface scratch resistance than improvement of the shape-holding property.

The chemical structure of the modified silicone oil used for the present invention is not particularly limited as long as the compound has a siloxane bond in the molecule and is the compound that an organic group other than methyl groups is also bound to a silicone atom (Si). Among them, the compound having the following formulae (S1) to (S4) are preferable for the scratch resistance to the structure surface. The formula (S1) represents a side chain type of the modified silicone oil, the formula (S2) represents a both end type thereof, the formula (S3) represents a one end type thereof, and the formula (S4) represents a side chain and both end type thereof.

In the formulae (S1) to (S4), —R represents —Y—OAc or —Y—CF$_3$ which may be different one another wherein Y represents an alkylene or polyether group having 1 to 50 carbon atoms and Ac represents a (meth)acryloyl group, m represents an integer of 1 to 250, and n represents an integer of 2 to 25.

In the above formulae, Y represents the alkylene or polyether group having 1 to 50 carbon atoms, and the alkylene group has particularly preferably 1 to 20 and more preferably 1 to 3 carbon atoms. As the polyether group, a polyethylene glycol chain or a polypropylene glycol chain is preferable, and those represented by —(C$_2$H$_4$O)$_a$— (a is the integer of 1 to 20), —(C$_3$H$_6$O)$_b$— (b is the integer of 1 to 25) or —(C$_2$H$_4$O)$_a$—(C$_3$H$_6$O)$_b$— (a is the integer of 1 to 20 and b is the integer of 1 to 25) are particularly preferable.

In any type of the formulae (S1) to (S4), m represents the integer of 1 to 250, preferably 5 to 180 and particularly preferably 10 to 130. In any type of the formulae (S1) to (S4), n represents the integer of 2 to 25, preferably 2 to 20 and particularly preferably 2 to 15. The particularly preferable values of m and n are determined in consideration of the followings.

In the modified silicone oil, the weight ratio of an R moiety present at the end or at the side chain to a dimethylsiloxane structure moiety which is a main chain is determined nearly by n/(m+n) in the side chain type and the side chain/end type, and by m in the end type. When the weight ratio of such a dimethylsiloxane structure moiety is increased, an anti-staining property tends to become better, but compatibility with urethane(meth)acrylate and ester(meth)acrylate worsens in some cases. Meanwhile, when the weight ratio of the dimethylsiloxane structure moiety is excessively decreased, the scratch resistance of the resulting structure worsens, a contained amount of the above compositions in the cured film is reduced because it is easily volatilized in a curing process, and thus, the effect of containing can not be sufficiently achieved in some cases.

Among them, those represented by the formula (S1) or (S4), wherein —R represents —Y—CF$_3$ and Y represents the alkyl group having 1 to 3 carbon atoms, or those represented by the formula (S1) to (S4), wherein the value of m is $10 \leq m \leq 200$ are excellent in not only mechanical strength such as scratch resistance but also anti-staining property. In terms of staining property, particularly preferably, the value of m is $15 \leq m \leq 150$, $20 \leq m \leq 100$.

A number average molecular weight of the modified silicone oil is preferably 400 to 20,000 and particularly preferably 1,000 to 15,000. When the number average molecular weight is too large, the compatibility with other components worsens in some cases, while when the number average molecular weight is too small, the surface scratch resistance is inferior in some cases.

[5] Composition of (Meth)Acrylic Polymerizable Composition

A content ratio of urethane(meth)acrylate, ester(meth)acrylate, epoxy(meth)acrylate and the modified silicone oil in the (meth) acrylic polymerizable composition is not particularly limited, and preferable ranges are shown below.

The amount of ester(meth)acrylate is preferably 10 parts by weight or more and particularly preferably 20 parts by weight or more relative to 100 parts by weight of urethane (meth)acrylate. The upper limit is preferably 400 parts by weight or less, more preferably 300 parts by weight or less, particularly preferably 200 parts by weight or less and most preferably 100 parts by weight. When the amount of ester (meth)acrylate is too large, the storage elastic modulus is reduced in some cases, while when it is too small, the structure on which the cured film has been formed becomes fragile and curing shrinkage is increased in some cases.

The amount of epoxy(meth)acrylate is preferably 0 to 50 parts by weight, particularly preferably 0 to 20 parts by weight and more preferably 1 to 10 parts by weight relative to 100 parts by weight of urethane(meth)acrylate.

The amount of the modified silicone oil is preferably 0 to 10 parts by weight, particularly preferably 0.02 to 5 parts by weight and more preferably 0.05 to 2 parts by weight relative to 100 parts by weight of urethane(meth)acrylate. When the amount of the modified silicone oil is too large, the modified silicone oil is separated in the structure and the opaque structure is formed in some cases, while when it is too small, the surface scratch resistance becomes inferior in some cases.

It is preferable that the structure of the present invention is obtained by polymerizing the (meth)acrylic polymerizable composition entirely having the following composition. Hereinafter, "%" represents % by weight.

| Urethane (meth)acrylate | 20 to 80% |
|---|---|
| Ester (meth)acrylate | 10 to 80% |
| Epoxy (meth)acrylate | 0 to 30% |
| Modified silicone oil | 0 to 8% |

It is particularly preferable to polymerize the (meth)acrylic polymerizable composition having the following composition.

| Urethane (meth)acrylate | 30 to 60% |
|---|---|
| Ester (meth)acrylate | 15 to 70% |
| Epoxy (meth)acrylate | 0 to 12% |
| Modified silicone oil | 0.006 to 3% |

The (meth) acrylic polymerizable composition can contain other (meth)acrylate, a polymerization initiator and the like in addition to those described above.

When the structure of the present invention is formed by light irradiation, the presence or absence of a photopolymerization initiator in the (meth)acrylic polymerizable composition which is the material of the structure is not particularly limited, but it is preferable to contain the photopolymerization initiator. The photopolymerization initiator is not particularly limited, and includes those publicly known and conventionally used for radical polymerization, for example, aryl ketone based photopolymerization initiators such as acetophenones, benzophenones, alkylamino benzophenones, benzyls, benzoins, benzoin ethers, benzylmethyl acetals, benzoyl benzoates and α-acyloxime esters; sulfur containing photopolymerization initiators such as sulfides and thioxanthones; acylphosphine oxides such as acyldiarylphosphine oxide; and anthraquinones. A photosensitizer can also be combined.

The amount of the photopolymerization initiator to be combined is typically 0.2 to 10 parts by weight and preferably 0.5 to 7 parts by weight relative to 100 parts by weight of the (meth)acrylate compound.

When the structure of the present invention is formed by thermal polymerization, it is preferable to contain a thermal polymerization initiator. As the thermal polymerization initiator, those publicly known and conventionally used for the radical polymerization can be used, and for example, peroxide, diazo compounds and the like are included.

In the (meth)acrylic polymerizable composition of the present invention, it is possible to further combine binder polymers, fine particles, antioxidants, ultraviolet ray absorbers, photo stabilizers, anti-foaming agents, mould releasing agents, lubricants and leveling agents and the like. These materials can be selected from those publicly known and conventionally used.

A method for producing the structure of the present invention is not particularly limited, and for example, the following method is preferable. That is, the above (meth)acrylic polymerizable composition is picked onto the substrate and applied so as to make a uniform film thickness by using a coating machine such as a bar coater or an applicator. Here, as the "substrate", the film of polyethylene terephthalate (hereinafter abbreviated as "PET") or triacetylcellulose, etc. is suitable. And, the mould possessing the above surface structure is attached thereto. After being attached, the film is cured by irradiating the ultraviolet ray or the electron beam and/or heating from the film side. Alternatively, the following method is also preferable. That is, the (meth)acrylic polymerizable composition may be directly picked onto the mould possessing the above surface structure to make a coating film having the uniform film thickness using the coating machine or a spacer. Subsequently, the resulting cured film is peeled from the film or the mould to make the structure of the present invention.

Figure 1:
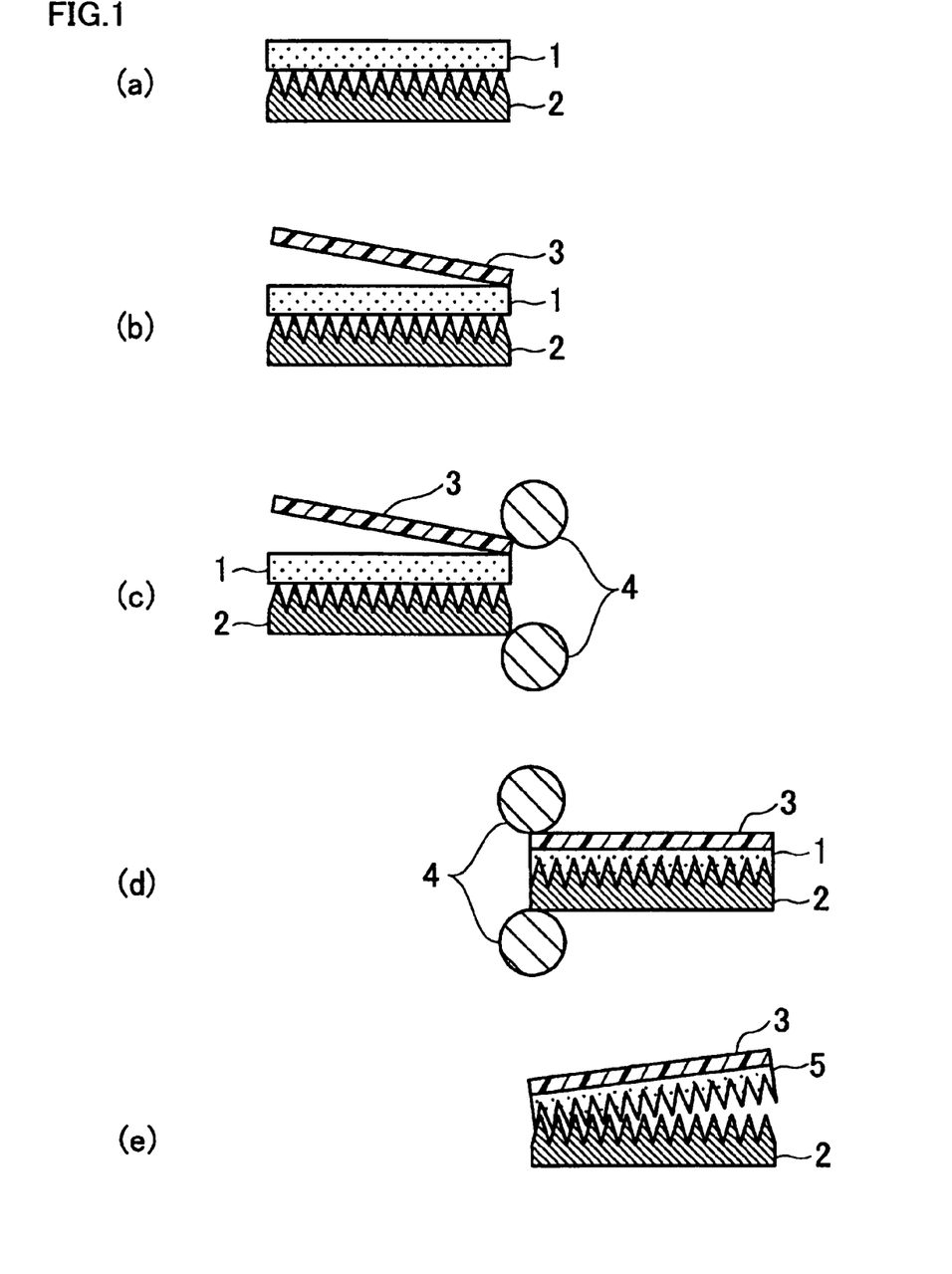
FIG. 1 is a schematic view showing one example of a method for producing a structure of the present invention.

Also, the particularly preferable method for producing the structure is as follows. That is, it is the method for producing the structure, characterized in that the (meth)acrylic polymerizable composition is supplied to the mould having convex parts with an average height of 100 nm or more and 1000 nm or less or concave parts with an average depth of 100 nm or more and 1000 nm or less wherein the convex parts or the concave parts are present at an average cycle of 100 nm or more and 400 nm or less in at least one certain direction, and then, the substrate is attached from the above obliquely to the surface of the mould and is bonded with pressure from the substrate side by using the roller. After the (meth)acrylic polymerizable composition is cured, it is peeled form the mould This method for production is specifically further described using FIG. 1, but the present invention is not limited to a specific aspect in FIG. 1. That is, the appropriate amount of the (meth)acrylic polymerizable composition (1) is supplied or applied to the mould (2) (FIG. 1(a)), and the substrate (3) is attached obliquely from a roller portion side as a supporting point (FIG. 1(b)). An attached body integrating the mould (2), the (meth)acrylic polymerizable composition (1) and the substrate (3) is moved to a roller (4) (FIG. 1(c)), and by bonding with pressure using the roller, the particular structure of the mould (2) (FIG. 1(e)) is transferred onto the (meth) acrylic polymerizable composition (1) to hold the shape (FIG. 1(d)). After curing this, by peeling this from the mould (2), the structure (5) which is the object of the present invention is obtained.

Figure 2:
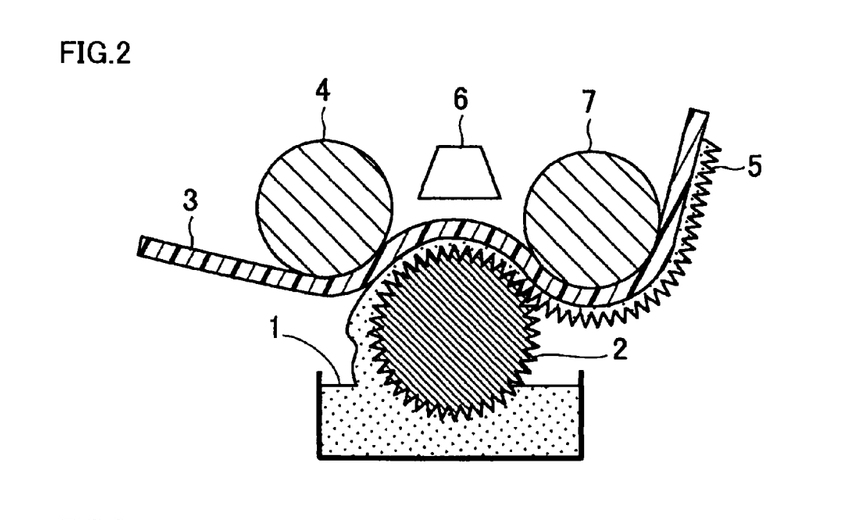
FIG. 2 is a schematic view showing one example of a continuous production apparatus for illustrating the method for producing the structure of the present invention.

FIG. 2 is a view of one example of an apparatus (6) for producing the structure in a continuous manner, but the present invention is not limited to this schematic view. That is, the (meth)acrylic polymerizable composition (1) is attached to the mould (2), a force is given by the roller (4), and the substrate (3) is bonded to the mould from an oblique direction to transfer the particular structure of the mould (2) onto the (meth)acrylic polymerizable composition (1). This is cured using a curing apparatus and subsequently peeled from the mould (2) to obtain the objective structure (5) of the present invention. A supporting roller (7) is for lifting the structure (5) upward.

By attaching from the oblique direction with the roller (4), the structure (5) having no defect with no bubble is obtained. Also by the use of the roller, a linear pressure is given, and thus, more pressure can be obtained, which becomes possible to produce the structure having a large area and it becomes easy to control the pressure. It also becomes possible to produce the structure having the uniform film thickness integrated with the substrate and the predetermined optical properties, and further, the structure becomes excellent in productivity because it can be produced in a continuous manner.

In the structure of the present invention it is essential to be polymerized by light irradiation, electron beam irradiation and/or heating, but the wavelength of the light in the light irradiation is not particularly limited. It is preferable that the light contains the visible light and/or the ultraviolet ray because the carbon-carbon double bonds of the (meth)acrylic groups are polymerized well in the presence of the photopolymerization initiator. Particularly preferable is the light containing the ultraviolet ray. A light source is not particularly limited, and those publicly known such as a very high pressure mercury lamp, a high pressure mercury lamp, a halogen lamp and various lasers can be used. In the case of the electron beam irradiation, the intensity and the wavelength of the electron beam are not particularly limited, and publicly known methods can be used.

When polymerized by heat, the temperature is not particularly limited, and is preferably 80° C. or above, particularly preferably 100° C. or above, and preferably 200° C. or below and particularly preferably 180° C. or below. When the polymerization temperature is too low, the polymerization does not sufficiently progress in some cases. When it is too high, the polymerization becomes uneven and the substrate is deteriorated in some cases. A heating time period is not also particularly limited, and is preferably 5 seconds or more, particularly preferably 10 seconds or more, and preferably 2 minutes or less and particularly preferably 30 seconds or less.

An action or a principle that the excellent mechanical strength is given to the structure, which becomes excellent in mechanical strength such as surface scratch resistance when the structure of the present invention having the particular surface structure has the particular storage elastic modulus is not clear. Furthermore, an action or a principle that the structure obtained by polymerizing the particular (meth)acrylic polymerizable composition has the particular storage elastic modulus can give the excellent mechanical strength, which becomes excellent in mechanical strength such as surface scratch resistance, is not clear. However, considering a dynamic physical property of a polymer molecule, it is conceivable that it is because the dynamic physical property whose fine parts of respective convex and concave parts becomes the value in the particular range makes it possible that the structure surface can have the performance to withstand an external force.

EXAMPLES

The present invention will be described below in more detail by Examples, but the present invention is not limited thereto without departing from the scope of the invention.

Example 1

A Structure Obtained by Curing a (Meth)Acrylic Polymerizable Composition Containing Neither Epoxy(Meth)Acrylate Nor Modified Scone Oil

[Production of Structure]

(Meth)acrylate compounds and a photopolymerization initiator shown in Table 1 were combined in amounts shown in Table 1 to give a (meth)acrylic polymerizable composition, and an appropriate amount thereof was picked onto a PET film and was applied so as to make a uniform film thickness using a bar coater NO28. Subsequently, a mould having the structure in which convex parts having an average height of 150 nm had been arranged with an average cycle of 205 nm on its surface was attached thereto. Confirming that the entire mould was attached with the (meth)acrylic polymerizable composition, the composition was cured by irradiating ultraviolet ray at 3.6 J/cm$^2$ using an UV irradiation apparatus supplied from Fusion to produce the structures (1) to (6). Numerals in Table 1 represent parts by weight, and the total amount of the (meth)acrylate compounds is 100 parts by weight.

TABLE 1

| ASSORTMENT | | (METH)ACRYLATE COMPOUND | NO. OF FUNCTIONAL GROUPS | STRUCTURE No. | | | | | |
|---|---|---|---|---|---|---|---|---|---|
| | | | | (1) | (2) | (3) | (4) | (5) | (6) |
| 1-1 URETHANE (METH) ACRYLATE | 1-1-1 TETRAFUNCTIONAL OR HIGHER | COMPOUND(1) | 10 | 11.8 | 11.8 | 11.8 | 11.8 | 11.8 | — |
| | 1-1-2 DIFUNCTIONAL | COMPOUND(2) | 2 | 23.0 | 23.0 | 23.0 | 23.0 | 41.3 | — |
| | | COMPOUND(3) | 2 | — | — | — | — | — | 34.8 |
| 1-2 ESTER (METH) ACRYLATE | 1-2-1 DIFUNCTIONAL | TRIPROPYLENE GLYCOL DIACRYLATE | 2 | — | — | 27.2 | — | — | 27.2 |
| | | TETRAETHYLENE GLYCOL DIACRYLATE | 2 | 45.2 | — | 25.0 | — | 25.0 | 25.0 |
| | | POLYETHYLENE GLYCOL DIACRYLATE | 2 | — | 42.2 | — | 52.2 | — | — |
| | 1-2-2 TETRAFUNCTIONAL OR HIGHER | PENTAERYTHRITOL HEXAACRYLATE | 6 | 20.0 | 23.0 | 13.0 | 13.0 | 13.0 | 13.0 |
| PHOTOPOLYMERIZATION INITIATOR | | 1-HYDROXYCYCLOHEXYLPHENYL KETONE | — | 2.0 | 2.0 | 2.0 | 2.0 | 2.0 | 2.0 |
| REACTION RATE (DOUBLE BOND CONSUMPTION RATE) (Mol %) | | | — | 91.6 | 98.5 | 94.4 | 94.9 | 86.6 | 96.0 |
| STORAGE ELASTIC MODULUS (GPa) | | | — | 0.73 | 0.80 | 0.39 | 0.30 | 0.41 | 0.15 |

In Table 1, the compound (1) is the compound represented by the following formula (1):

wherein X represents a dipentaerythritol residue (having 6 hydroxy groups).

In Table 1, the compound (2) is the compound represented by 2HEA--IPDI--(polyester of adipic acid and 1,6-hexanediol having the weight average molecular weight of 3,500 and having the hydroxy group at the end)--IPDI--2HEA.

In Table 1, the compound (3) is the compound represented by 2HEA--IPDI--(polyester of adipic acid and 1,4-butanediol having a weight average molecular weight of 25,000 and having the hydroxy group at the end)--IPDI-2HEA.

Here, "2HEA" represents 2-hydroxyethyl acrylate, "IPDI" represents isophorone diisocyanate, and "--" represents the bond by the following usual reaction of the isocyanate group and the hydroxy group.

Physical properties of the structures (1) to (6) were measured by the following measurement methods.
<Reaction Rate>

Absorbance before and after the exposure was measured by an infrared spectroscopic analysis (IR), and a consumption rate of the double bonds, i.e., the reaction rate was calculated from an absorbance ratio of (meth)acryl double bonds. Results are shown collectively in Table 1.
<Storage Elastic Modulus>

Figure 3:
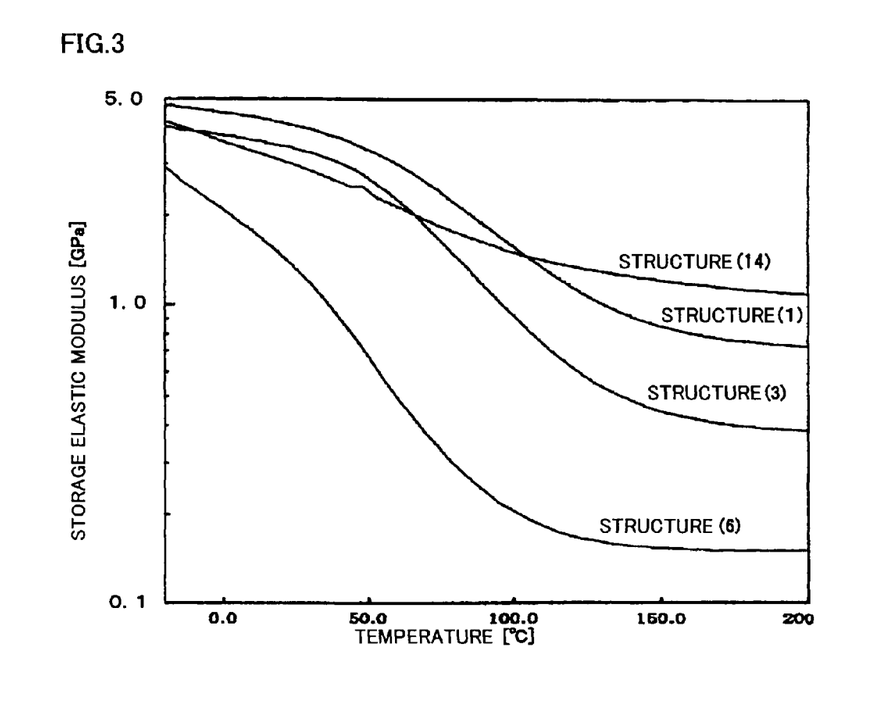
FIG. 3 is a graph showing the temperature dependency of the storage elastic modulus in the structures (1), (3), (6) and (14) in Examples 1 and 2.

The structures (1) to (6) obtained above were each cut into 5 mm×20 mm to make a test piece of 5 mm×20 mm×100 μm. Using a dynamic viscoelasticity tester DMS6100 supplied from Seiko Instruments Inc., the above test piece was sandwiched in a direction of 20 mm, and a force of 10 Hz frequency was added to measure at a temperature range of −20 to 200° C. Then, the temperature range which gave the rubber region was found in each test piece. In FIG. 3, a graph of the structures (1), (3) and (6) is shown when a horizontal axis is the temperature and a vertical axis is the storage elastic modulus. A flat part which appears at about 150° C. or above is the rubber region. Since the range at approximately 180 to 200° C. was the rubber region in all the test pieces, all values of the storage elastic modulus were measured at 190° C. The results are shown in Table 1.

The structures (1) to (6) were evaluated by the following evaluation methods.
[Reflectance]

Using a self-recording spectrophotometer "UV-3150" supplied from Shimadzu Corporation, a black tape was attached on the backside, and a 50 incident absolute reflectance was measured from the backside. The results are shown in Table 2.
[Light Permeability]

Using a haze mater "HGM-2DP" supplied from Suga Test Instruments Co., Ltd., an average permeability of the visible light was measured. The results are shown in Table 2.
[Evaluation of Surface Scratch Resistance]

Steel wool #0000 was evenly attached on a smooth cross section of a 25 mm cylinder which is mounted on a surface test machine, Tribogear Type-14DR of Shinto Kagaku, and the above structures (1) to (6) is set to the machine. By reciprocating the cylinder of the machine on the structure at a speed of 10 cm/second with 400 g of load, the surface of the structure is scratched, and then the scratch resistance has be measured. The levels were determined by the following criteria. The results are shown in Table 2.
[Determination Criteria]

5: No scratch
4: Several scratches
3: A half of the 25 mm cylinder was scratched
2: Two thirds of the 25 mm cylinder was scratched
1. All the 25 mm cylinder was scratched

TABLE 2

| STRUCTURE NO. | (1) | (2) | (3) | (4) | (5) | (6) |
|---|---|---|---|---|---|---|
| REFLECTANCE RATIO | 1.3% | 1.4% | 1.4% | 1.5% | 1.3% | 1.3% |
| LIGHT PERMEABILITY | 94.3% | 94.1% | 93.8% | 94.2% | 94.3% | 93.9% |
| SURFACE SCRATCH RESISTANCE | 5 | 5 | 3 | 3 | 3 | 1 |

Table 2 shows that the structure having such a structure has a good antireflection performance and a good performance of light permeability, and further, the structures (1) and (2) having the storage elastic modulus of 0.5 GPa or more are excellent also in surface scratch resistance. Meanwhile, both the structures (3) and (6) having the storage elastic modulus of less than 0.5 GPa were inferior in surface scratch resistance.

Example 2

A Structure Obtained by Polymerizing a (Meth)Acrylic Polymerizable Composition Further Containing Epoxy(Meth)Acrylate and/or Modified Silicone Oil

[Production of Structure]

The (meth)acrylate compounds and/or the modified silicone oil, and 1-hydroxycyclohexylphenyl ketone which was the photopolymerization initiator shown in Table 3 were combined in amounts shown in Table 3 to give the (meth)acrylic polymerizable composition. Then, the appropriate amount thereof was picked onto the mould having the structure in which the convex parts having the average height of 400 nm had been arranged with the average cycle of 200 nm (aspect ratio of 2.0). Subsequently, the PET film which was the substrate was attached to the mould with the composition, obliquely from the direction of the roller portion, and the attached body was bonded with pressure using the roller (supplied from Taisei Laminator Co., Ltd.), and then, the composition was confirmed to be evenly coated onto the mould. Further, the attached body wherein the composition was coated were cured by irradiating the ultraviolet ray at 1.0 J/cm² from the substrate side using the UV irradiation apparatus supplied from Fusion. After curing, the structures (11) to (24) were produced by peeling from the mould.

In Table 3, the compounds (1) and (2) are the same as those used in Example 1, and chemical structures and manufacturers of the modified silicone oils used are shown in Table 4. The numerals in Table 3 represent parts by weight, and the total amount of the (meth)acrylate compounds is 100 parts by weight. Blank columns in Table 3 indicate "0", i.e., not containing.

For the obtained structures (11) to (24), the storage elastic modulus, the reflectance and the light permeability were measured by the same ways as in Example 1. The surface scratch resistance was measured by the methods not only loading 400 g as the above but also loading 200 g, and determined by the same determination criteria as the above. The results are shown in Table 2. In Table 3, "(11) to (24)" in top columns represent the structure numbers, i.e., the "structures (11) to (24)". For the structure (14), the temperature dependency of the storage elastic modulus is also shown in FIG. 3.

[Staining Resistance]

A fingerprint was left on the structure surface, and wiped it off 5 times with tissue paper impregnated with water. Subsequently, the level of staining was visually observed and determined by the following determination criteria. The results are shown in Table 3.

[Determination Criteria]
5: No staining with fingerprint
4: Nearly no staining with fingerprint
3: Staining with fingerprint can be visually observed when observed obliquely.
2: Staining with fingerprint can be visually observed from the front.
1: Staining with fingerprint can be visually observed clearly from the front

TABLE 3

| ASSORTMENT | COMPOUND NAME | NO. OF FUNCTIONAL GROUPS | (11) | (12) | (13) | (14) | (15) | (16) | (17) |
|---|---|---|---|---|---|---|---|---|---|
| URETHANE | COMPOUND (1) | 10 | 11.8 | 11.8 | 11.8 | 47.5 | 47.5 | 11.8 | 11.8 |
| (METH)ACRYLATE | COMPOUND (2) | 2 | 23 | 23 | 23 | | | 23 | 23 |
| ESTER | TETRAETHYLENE GLYCOL DIACRYLATE | 2 | 45.2 | | 25.0 | | | 45.2 | 45.2 |
| (METH)ACRYLATE | POLYETHYLENE GLYCOL #400 DIACRYLATE | 2 | | 37.2 | | | | | |
| | POLYETHYLENE GLYCOL #600 DIACRYLATE | 2 | | | 27.2 | 47.5 | 47.5 | | |
| | DIPENTAERYTHRITOL HEXAACRYLATE | 6 | 20 | 23 | 13 | | | 20 | 20 |
| EPOXY (METH)ACRYLATE | BISPHENOL A BASED EPOXY ACRYLATE | 2 | | 5 | | 5 | 5 | | |
| MODIFIED SILICONE OIL | TegoRad2200N | 2 | 0.5 | 0.5 | 0.5 | 0.5 | | | |
| | X-22-164AS | 2 | | | | | | 0.5 | |
| | X-22-164E | 2 | | | | | | | 0.5 |
| | X-24-8201 | 1 | | | | | | | |
| | X-22-2426 | 1 | | | | | | | |
| | X-22-2404 | 1 | | | | | | | |
| | FL100-100st | 0 | | | | | | | |
| | FL100-450st | 0 | | | | | | | |
| PHOTOPOLYMERIZATION INITIATOR | 1-HYDROXYCYCLOHEXYL KETONE | | 5 | 5 | 5 | 5 | 5 | 5 | 5 |
| | STORAGE ELASTIC MODULUS (GPa) | | 0.73 | 0.80 | 0.90 | 1.10 | 1.00 | 0.75 | 0.81 |
| | REFLECTANCE RATIO (Y VALUE) (%) | | 0.2 | 0.2 | 0.2 | 0.2 | 0.2 | 0.2 | 0.2 |
| | LIGHT PERMEABILITY (%) | | 97.0 | 97.3 | 97.1 | 97.0 | 97.5 | 97.6 | 97.2 |
| | SURFACE SCRATCH RESISTANCE (200 g OF LOAD) | | 4~5 | 4~5 | 5 | 5 | 5 | 4 | 4~5 |
| | SURFACE SCRATCH RESISTANCE (400 g OF LOAD) | | 4 | 4 | 4~5 | 5 | 4~5 | 4 | 4 |
| | STAINING RESISTANCE | | 1 | 1 | 1 | 1 | 1 | 1 | 4 |

| ASSORTMENT | COMPOUND NAME | (18) | (19) | (20) | (21) | (22) | (23) | (24) |
|---|---|---|---|---|---|---|---|---|
| URETHANE | COMPOUND (1) | 11.8 | 11.8 | 11.8 | 11.8 | 11.8 | | 11.8 |
| (METH)ACRYLATE | COMPOUND (2) | 23 | 23 | 23 | 23 | 23 | 34.8 | 23 |
| ESTER (METH)ACRYLATE | TETRAETHYLENE GLYCOL DIACRYLATE | 45.2 | 45.2 | 45.2 | 45.2 | 45.2 | 45.2 | 45.2 |
| | POLYETHYLENE GLYCOL #400 DIACRYLATE | | | | | | | |
| | POLYETHYLENE GLYCOL #600 DIACRYLATE | | | | | | | |
| | DIPENTAERYTHRITOL HEXAACRYLATE | 20 | 20 | 20 | 20 | 20 | 20 | 20 |
| EPOXY (METH)ACRYLATE | BISPHENOL A BASED EPOXY ACRYLATE | | | | | | | |
| MODIFIED SILICONE OIL | TegoRad2200N | | | | | | 0.5 | |
| | X-22-164AS | | | | | | | |
| | X-22-164E | | | | | | | |
| | X-24-8201 | 0.5 | | | | | | |
| | X-22-2426 | | 0.5 | | | | | |
| | X-22-2404 | | | 0.5 | | | | |

TABLE 3-continued

| | | | | | | | | | |
|---|---|---|---|---|---|---|---|---|---|
| | | FL100-100st | | | | | 0.5 | | |
| | | FL100-450st | | | | | | 0.5 | |
| | PHOTOPOLYMERIZATION INITIATOR | 1-HYDROXYCYCLOHEXYL KETONE | 5 | 5 | 5 | 5 | 5 | 5 | 5 |
| | | STORAGE ELASTIC MODULUS (GPa) | 0.76 | 0.78 | 0.80 | 0.73 | 0.79 | 0.20 | 0.73 |
| | | REFLECTANCE RATIO (Y VALUE) (%) | 0.2 | 0.2 | 0.2 | 0.2 | 0.2 | 0.2 | 0.2 |
| | | LIGHT PERMEABILITY (%) | 96.8 | 97.4 | 96.9 | 97.0 | 97.1 | 97.2 | 97.0 |
| | | SURFACE SCRATCH RESISTANCE (200 g OF LOAD) | 4~5 | 4~5 | 4 | 4 | 4 | 1 | 4 |
| | | SURFACE SCRATCH RESISTANCE (400 g OF LOAD) | 4 | 4~5 | 4 | 4 | 4 | 1 | 4 |
| | | STAINING RESISTANCE | 5 | 5 | 1 | 5 | 5 | 1 | 1 |

TABLE 4

| PRODUCT NAME | MANUFACTURE NAME | TYPE | MODIFICATION | —R IN FORMULAE (S1) TO (S4) |
|---|---|---|---|---|
| TegoRad2200N | DEGUSSA | SIDE CHAIN TYPE | METHACRYL POLYETHER | -(POLYETHER)-MAc |
| X-22-164AS | SHIN-ETSU SILICONE | BOTH END TYPE | METHACRYL ALKYL | —R—OMAc |
| X-22-164E | SHIN-ETSU SILICONE | BOTH END TYPE | METHACRYL ALKYL | —R—OMAc |
| X-24-8201 | SHIN-ETSU SILICONE | ONE END TYPE | METHACRYL ALKYL | —$C_3H_6$—OMAc |
| X-22-2426 | SHIN-ETSU SILICONE | ONE END TYPE | METHACRYL ALKYL | —$CH_3(CH_2)_3$—OMAc |
| X-22-2404 | SHIN-ETSU SILICONE | ONE END TYPE | METHACRYL ALKYL | FOLLOWING STRUCTURE |
| FL100-100st | SHIN-ETSU SILICONE | SIDE CHAIN TYPE | FLUOROALKYL | —$CH_2CH_2CF_3$ |
| FL100-450st | SHIN-ETSU SILICONE | SIDE CHAIN TYPE | FLUOROALKYL | —$CH_2CH_2CF_3$ |

In Table 4, "MAc" represents methacryloyl group, and "X-22-2404" is the modified silicone oil having the following structure.

As is seen from Table 3, among the structures (11) to (24), only the structure (23) has the small storage elastic modulus of 0.20 and was inferior in surface scratch resistance, but those other than it have the storage elastic modulus of 0.5 GPa or more and were excellent in surface scratch resistance. Further the structures (17), (18), (19), (21), and (22) are also excellent in staining resistance. For the staining resistance, the determination criteria "4" and "5" are particularly preferable, but those even having the staining resistance of "1" can be used suitably with no problem if only the intended use is limited.

INDUSTRIAL APPLICABILITY

The structure of the present invention provides the good visibility because it is excellent in antireflection performance of the light and an improved performance of light permeability. Because of having the excellent mechanical strength (surface scratch resistance, surface abrasion resistance), the structure of the present invention is widely and suitably utilized for the use of flat panel displays (FPD) such as liquid crystal displays (LCD), plasma displays (PDP), organic EL (OEL) and field emission displays (FED), where the mechanical external force is easily given to their surface. In general, it is also utilized widely and suitably as antireflection films, films of which light permeability is improved and surface protection films.

What is claimed is:

1. A structure having convex parts with an average height of 100 nm or more and 1000 nm or less or concave parts with an average depth of 100 nm or more and 1000 nm or less on its surface wherein the convex parts or the concave parts are present at an average cycle of 100 nm or more and 400 nm or less in at least one direction, characterized in that the structure is obtained by polymerizing a (meth)acrylic polymerizable composition by light irradiation, electron beam irradiation and/or heating and a storage elastic modulus at 180° C. or above is 0.5 GPa or more.

2. The structure according to claim 1 wherein said (meth)acrylic polymerizable composition contains urethane(meth)acrylate and ester(meth)acrylate.

3. The structure according to claim 2 wherein said urethane (meth)acrylate contains tetrafunctional or higher urethane (meth)acrylate.

4. The structure according to claim 3 wherein said tetrafunctional or higher urethane(meth)acrylate is obtained by reacting a hydroxy group in a compound having one hydroxy group and two or more (meth)acryl groups in a molecule to substantially all isocyanate groups in a polyvalent isocyanate compound.

5. The structure according to claim 3 wherein said urethane (meth)acrylate further contains difunctional urethane(meth) acrylate having each one (meth)acryl group at both ends in a molecule.

6. The structure according to claim 2 wherein said ester (meth)acrylate contains difunctional ester(meth)acrylate having an alkylene glycol chain and having each one (meth) acryl group at both ends in the molecule.

7. The structure according to claim 6 wherein said ester (meth)acrylate further contains trifunctional or higher ester (meth)acrylate.

8. The structure according to claim 2 wherein said (meth) acrylic polymerizable composition further contains epoxy (meth)acrylate.

9. The structure according to claim 2 wherein said (meth) acrylic polymerizable composition further contains a modified silicone oil.

10. The structure according to any one of claims 1 to 9 for antireflection of light and/or an improved performance of light permeability.

11. A method for producing the structure according to any one of claims 1 to 9, characterized in that a (meth)acrylic polymerizable composition is supplied to a mould having convex parts with an average height of 100 nm or more and 1000 nm or less or concave parts with an average depth of 100 nm or more and 1000 nm or less on its surface wherein the convex parts or the concave parts are present at an average cycle of 100 nm or more and 400 nm or less in at least one direction, a substrate is attached from the above obliquely to the surface of the mould and bonded with pressure from a substrate side using a roller, and the (meth)acrylic polymerizable composition is cured and subsequently peeled from the mould.

12. A (meth)acrylic polymerizable composition which polymerizes to form a structure having a storage elastic modulus at 180° C. or above of 0.5 GPa or more, and which comprises a urethane(meth)acrylate and an ester(meth)acrylate.

13. The (meth)acrylic polymerizable composition according to claim 12, which polymerizes in a mold having a structured surface to form a structure having convex parts with an average height of 100 nm or more and 1000 nm or less or concave parts with an average depth of 100 nm or more and 1000 nm or less on a surface wherein the convex parts or the concave parts are present at an average cycle of 100 nm or more and 400 nm or less in at least one direction.

14. The (meth)acrylic polymerizable composition according to claim 12, wherein the ester(meth)acrylate is a difunctional ester(meth)acrylate having an alkylene glycol chain and a (meth)acryl group at both ends of the molecule.

15. The (meth)acrylic polymerizable composition according to claim 13 or 14, wherein the urethane(meth)acrylate comprises a tetrafunctional or higher functional urethane (meth)acrylate.

16. A method for producing the structure according to claim 1, comprising:
supplying the (meth)acrylic polymerizable composition to a mold having a structured surface with convex parts having an average height of 100 nm or more and 1,000 nm or less or concave parts having an average depth of 100 or more and 1,000 nm or less wherein the convex parts or the concave parts are present on the surface of the mold at an average cycle of 100 nm or more and 400 nm or less in at least one direction;
attaching, from above, a substrate obliquely to the surface of the mold to which the (meth)acrylic polymerizable composition has been supplied;
bonding the substrate to the mold with pressure from a substrate side with a roller;
curing the (meth)acrylic polymerizable composition; and
peeling the cured (meth)acrylic polymerizable composition from the mold.

17. The method according to claim 16 wherein said (meth) acrylic polymerizable composition contains urethane(meth) acrylate and ester(meth)acrylate.

18. The method according to claim 17 wherein said urethane(meth)acrylate contains tetrafunctional or higher urethane(meth)acrylate.

19. The method according to claim 18 wherein said tetrafunctional or higher urethane(meth)acrylate is obtained by reacting a hydroxy group in a compound having one hydroxy group and two or more (meth)acryl groups in a molecule to substantially all isocyanate groups in a polyvalent isocyanate compound.

20. The method according to claim 18 wherein said urethane(meth)acrylate further contains difunctional urethane (meth)acrylate having each one (meth)acryl group at both ends in a molecule.

21. The method according to claim 17 wherein said ester (meth)acrylate contains difunctional ester(meth)acrylate having an alkylene glycol chain and having each one (meth) acryl group at both ends in the molecule.

22. The method according to claim 21 wherein said ester (meth)acrylate further contains trifunctional or higher ester (meth)acrylate.

23. The method according to claim 17 wherein said (meth) acrylic polymerizable composition further contains epoxy (meth)acrylate.

24. The method according to claim 17 wherein said (meth) acrylic polymerizable composition further contains a modified silicone oil.

* * * * *